(12) United States Patent
Morand et al.

(10) Patent No.: US 9,228,749 B2
(45) Date of Patent: Jan. 5, 2016

(54) HEATING WIRE SUPPORT MESHING AND METHOD OF CONSTRUCTING A HEATED SURFACE WITH SAME

(75) Inventors: Michel Morand, Ile des Soeurs (CA); Philippe Charron, Boucherville (CA)

(73) Assignee: FLEXTHERM INC., Longueuil (CA)

( * ) Notice: Subject to any disclaimer, the term of this patent is extended or adjusted under 35 U.S.C. 154(b) by 1133 days.

(21) Appl. No.: 12/501,530

(22) Filed: Jul. 13, 2009

(65) Prior Publication Data
US 2010/0065548 A1    Mar. 18, 2010

(30) Foreign Application Priority Data
Sep. 15, 2008  (CA) .................................... 2639591

(51) Int. Cl.
| | |
|---|---|
| *H05B 3/34* | (2006.01) |
| *H05B 3/54* | (2006.01) |
| *H05B 3/06* | (2006.01) |
| *F24D 13/02* | (2006.01) |
| *E04F 15/18* | (2006.01) |
| *E04F 21/16* | (2006.01) |
| *E04F 21/24* | (2006.01) |
| *H05B 3/80* | (2006.01) |

(52) U.S. Cl.
CPC .............. *F24D 13/024* (2013.01); *E04F 15/18* (2013.01); *E04F 21/16* (2013.01); *E04F 21/24* (2013.01); *H05B 3/80* (2013.01); *H05B 2203/017* (2013.01); *Y02B 30/26* (2013.01); *Y10T 29/49826* (2015.01)

(58) Field of Classification Search
CPC ...... H05B 3/80; H05B 3/32; H05B 2203/017; B25B 27/08; H02G 3/185; H02G 3/26; H02G 3/0431; E04C 2/521; E04B 5/48; E04B 9/064; E04B 2002/7488; F16L 5/04
USPC .................... 219/523, 528, 529, 532; 29/248; 52/220.1–220.8; 174/135, 68.1
See application file for complete search history.

(56) References Cited

U.S. PATENT DOCUMENTS

| | | | | |
|---|---|---|---|---|
| 2,745,942 | A | * | 5/1956 | Cohen ........................... 219/528 |
| 3,790,746 | A | * | 2/1974 | Krieger .......................... 219/213 |
| 4,646,814 | A | * | 3/1987 | Fennesz .......................... 165/56 |
| 4,878,332 | A | | 11/1989 | Drake |
| 5,042,569 | A | * | 8/1991 | Siegmund ....................... 165/56 |
| 5,131,458 | A | | 7/1992 | Bourne et al. |

(Continued)

FOREIGN PATENT DOCUMENTS

EP    1157241 B1    11/2003

*Primary Examiner* — Dana Ross
*Assistant Examiner* — Hemant Mathew
(74) *Attorney, Agent, or Firm* — Norton Rose Fulbright Canada LLP

(57) ABSTRACT

A heating wire support meshing and a method of constructing a heated surface, particularly a floor surface therewith, is described. The heating wire support meshing comprises one or more mats formed by transversely spaced parallel rows of wire support bridge elements interconnected together at their crossings. The bridge elements have electric heating wire support slots to receive and guide one or more electric heating wires along one or more desired paths. Bottom support formations extend along a bottom planar surface of the mat. Top support formations lie in a top planar surface of the mat. The wire support slots are adapted to support the one or more electric heating wires spaced below the top support formations. The support meshing also acts as a reinforcement of a sub-floor on which the support meshing is installed.

10 Claims, 4 Drawing Sheets

(56) References Cited

U.S. PATENT DOCUMENTS

| | | | |
|---|---|---|---|
| 5,675,950 A * | 10/1997 | Schilham | 52/263 |
| 7,250,570 B1 | 7/2007 | Morand et al. | |
| 2006/0086717 A1 * | 4/2006 | Oosterling | 219/528 |
| 2008/0017725 A1 * | 1/2008 | Backman | 237/69 |
| 2009/0026192 A1 * | 1/2009 | Fuhrman | 219/523 |

* cited by examiner

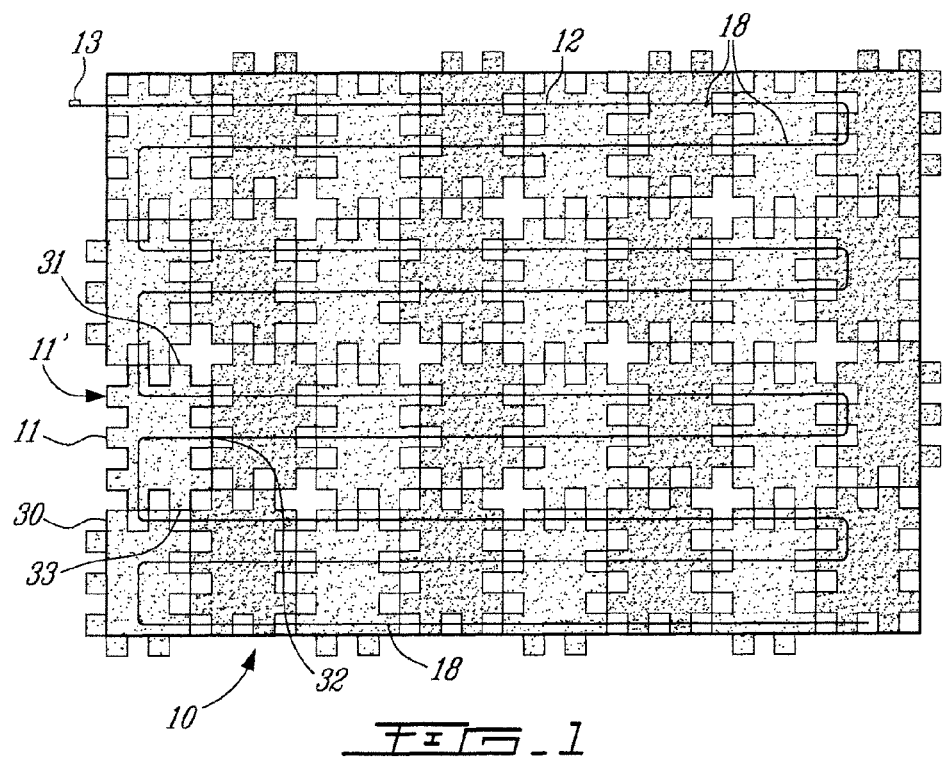
FIG_1
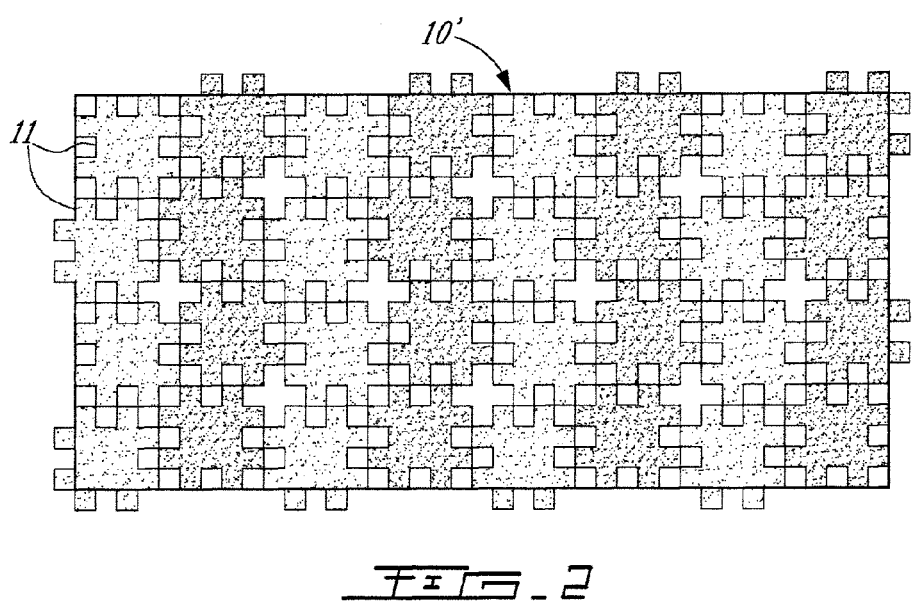
FIG_2

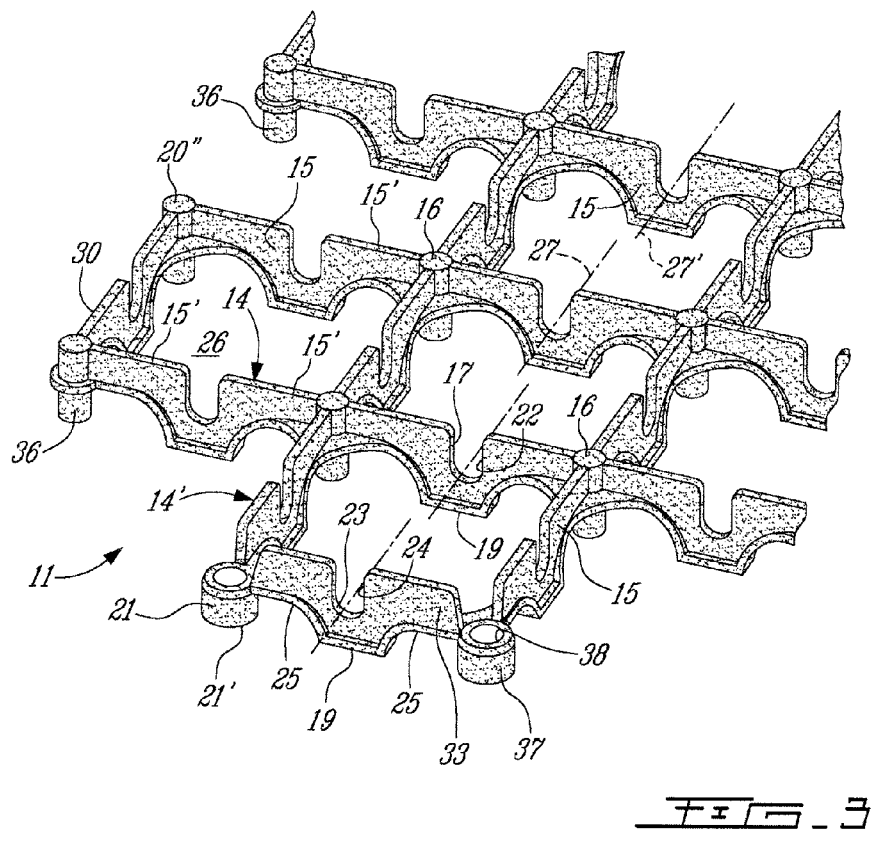
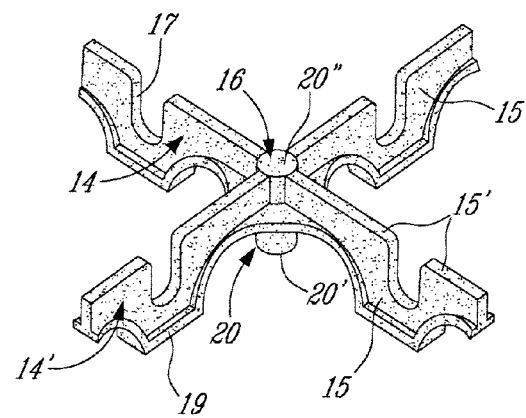

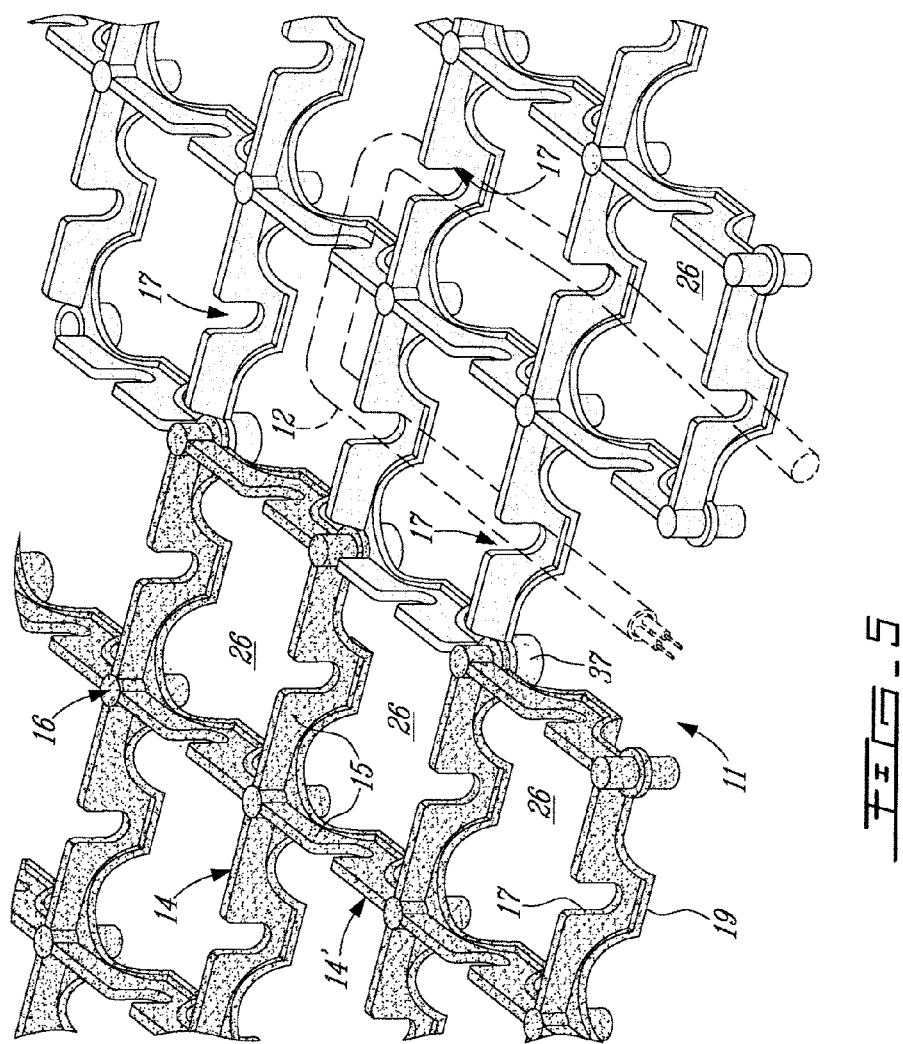

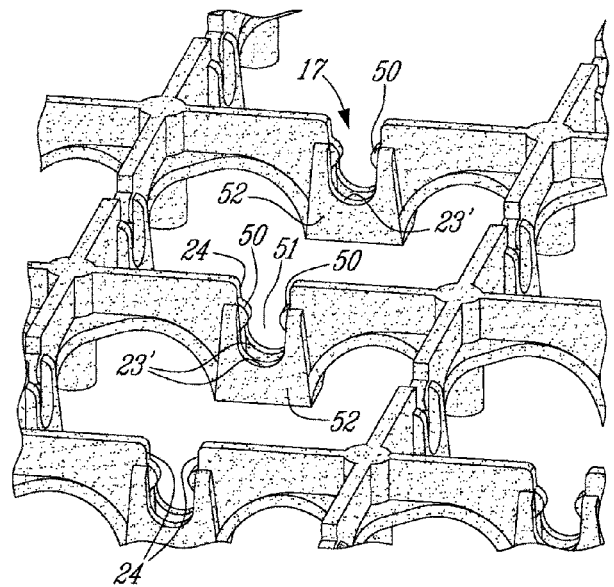
FIG_6
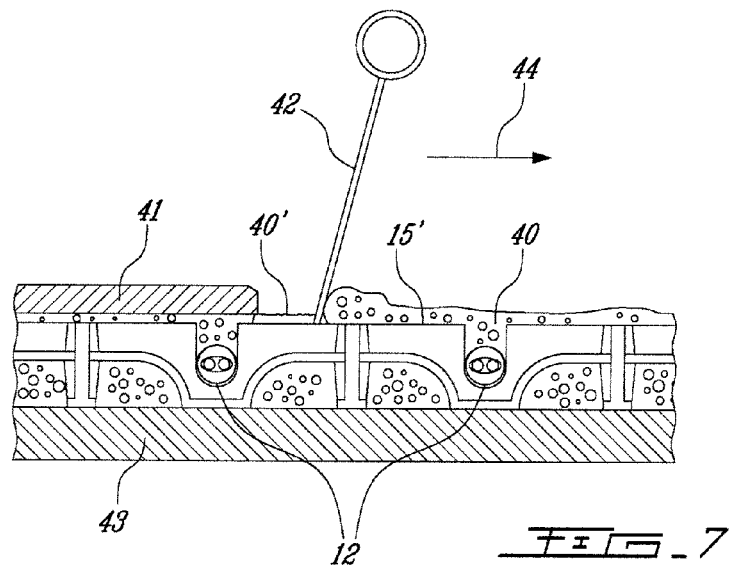
FIG_7

HEATING WIRE SUPPORT MESHING AND METHOD OF CONSTRUCTING A HEATED SURFACE WITH SAME

TECHNICAL FIELD

The present invention relates to a heating wire support meshing and a method of constructing a heated surface, for example a floor surface, having one or more heating wires supported therein. Further, the heating wire support meshing of the present invention reinforces a sub-floor and permits the complete construction of a radiant floor including the application of a floor covering material in a single installation session.

BACKGROUND ART

Guide strips which are securable to a floor for attaching and supporting heating wire circuits on a sub floor structure are known. An example of such floor heating system is described in Applicant's U.S. Pat. No. 7,250,570 issued Jul. 31, 2007. With these systems the wire retaining strips are secured to the sub-floor surface which, if made of wood, is usually constituted by two layers of sheeting material, such as plywood sheeting, which are secured by means of screws to prevent movement of the sub-floor. The rigid sub-floor supports a cement slurry as well as the covering material thereover, usually ceramic tiles, and its rigidity is required to prevent the cement to crack or to cause the electric wires to break due to movement.

A disadvantage of these known systems is that there is a need to solidify the sub-flooring which is costly in material and installation time. There is also a further need to provide different trade people to complete the entire construction of the radiant heated floor. After the sub-floor is constructed by a carpenter, another tradesman installs the heating cable guide strips onto the floor and then lays the heating wires onto the floor and attaches them to the guide strips. Another tradesman is then required to apply the cementitious slurry over the heating wire and the interval between the installation of the wire and the pouring of the slurry may take several days leaving the wires exposed to other tradesmen to walk and this often damages the wired circuits. It is common to cover the set dried cementitious slurry with ceramic tiles and a further tradesman is needed to install the tiles onto the set concrete floor. Accordingly, as can be seen, this installation is very time consuming and expensive and exposes the heating wires to damage.

SUMMARY OF THE INVENTION

It is a feature of the present invention to provide a heating wire support meshing and a method of constructing a heated surface utilizing the meshing and which substantially overcomes the above-mentioned disadvantages.

It is a further feature of the present invention to provide a heating wire support meshing which permits the installation of heating wire circuits thereinto and which protects the wires while supporting them throughout its length from a sub-floor surface.

Another feature of the present invention is to provide a heating wire support meshing on which a person can walk with the heating wire circuits installed therein while protecting the wire circuit.

Another feature of the present invention is to provide a heating wire support meshing which does not require reinforced sub-flooring for the construction of a ceramic tile radiant floor.

Another feature of the present invention is to provide a heating wire support meshing which can be cut to the contour of a surface area to be heated and which may be provided in roll form with the heating wires engaged therein.

Another feature of the present invention is to provide a method of constructing a radiant heating surface over a sub-surface in a single operation including the installation of the support meshing and heating wire circuits, the application of a cementitious slurry and the application of a surface covering material such as ceramic tiles, etc. thereover and this construction being effected by a single trade person in a single installation session.

According to the above features, from a broad aspect, the present invention provides a heating wire support meshing comprising one or more plastic molded flexible mats formed by transversely spaced parallel rows of wire support bridge formations formed by vertical flat walls interconnected together at their crossings. The wire support bridge formations have vertical wire receiving slots having an open top end for receiving and guiding an electric heating wire along one or more desired paths between a bottom planar surface and a top planar surface of said wire support bridge formations. The wire receiving slots each have a protrusion in one or both side walls thereof to define a restricted throat opening in a top end portion of the slot whereby to maintain the electric heating wire captive thereunder.

According to a further broad aspect of the present invention, there is provided a method of constructing a heated surface having one or more heating wires therein. The method comprises the steps of providing on a sub-surface a heating wire support mat having wire support means for receiving and guiding the one or more electric heating wires along one or more desired paths. Bottom support formations extend along a bottom planar surface of the mat section. The heating wire support mat has a bottom planar surface and a top planar surface. The wire support means is adapted to support the one or more electric heating wires below the top planar surface. The method further comprises spreading the continuous slurry, using a cement spreading tool, over the wire support mat to cause the slurry to project at a substantially predetermined height above the top planar surface while the spreading tool is guidingly supported over the top planar surface. The method further comprises applying a surface covering material on the cementitious surface.

According to a further broad aspect of the present invention the above-described method further comprises re-enforcing the sub-surface with the heating wire support mat to provide for the application of a ceramic covering material on the cementitious surface.

According to a further broad aspect of the present invention the above-described method further comprises effecting all of the steps in a continuous sequence.

BRIEF DESCRIPTION OF THE DRAWINGS

A preferred embodiment of the present invention will now be described with reference to the accompanying drawings in which:

FIG. 1 is a top view of a heating wire support meshing, constructed in accordance with the present invention and comprised of an assembly of small mats interconnected together and adapted to retain a heating wire captive therein;

FIG. 2 is a view similar to FIG. 1 but showing mat sections of a square construction whereas in FIG. 1 the mat sections are of rectangular construction;

FIG. 3 is an enlarged fragmented view illustrating the construction of the transversely spaced parallel rows of wire support bridge formations and their interconnections at their crossings as well as the construction of the attachment posts for securing two or more mat sections together;

FIG. 4 is an enlarged view of FIG. 3 showing the construction of the post junction;

FIG. 5 is a view similar to FIG. 3 but showing two mat sections interconnected together at their post junctions and the position of a heating wire retained in the vertical wire receiving slots formed in the support bridge formations;

FIG. 6 is a perspective view illustrating a wire retention means formed with the vertical wire receiving slot;

FIG. 7 is a fragmented section view showing how a radiant heating floor is constructed using the heating wire support meshing of the present invention.

DESCRIPTION OF PREFERRED EMBODIMENTS

Referring now to the drawings and more particularly to FIG. 1, there is shown generally at 10 a heating wire support meshing which is comprised of a plurality of mat sections 11 interconnected together as will be described later. A heating wire 12 is retained within the support meshing in an array to form a heating circuit. An end connector 13 is secured to a free end of the heating wire 12 which is enclosed within the meshing for coupling to a cold lead connector (not show), as is well known to a person skilled in the art, which leads to a thermostat which controls the feed of electric current to the heating wire 12.

As shown in FIG. 1, the mat sections 11 are of substantially rectangular outline whereas in FIG. 2 they are substantially of a square outline. The mat sections 11 are formed by transversely spaced parallel rows of wire support bridge formations interconnected at their junctions but this is not illustrated in FIGS. 1 and 2 for reason of clarity. The details of the construction of the support meshings 10 and 10', and more specifically of the mat sections 11, will now be described with reference to FIGS. 3 and 4.

Each of the mat sections 11 is formed by transversely spaced parallel rows, namely rows 14 and 14' of wire support bridge formations 15. The wire support bridge formations 15 are interconnected together at their crossings by a post junction 16 which is better illustrated in FIG. 4. The wire support bridge formations 15 have wire support means in the form of a vertical wire receiving slot 17 for receiving and guiding an electric heating wire 12, shown in FIG. 5, along one or more desired paths such as the paths 18 shown in FIG. 1.

The mat sections 11 are further provided with bottom support formations constituted by flat bottom wall portions 19 of the wire support bridge formations 15 and the bottom face 20' of the attachment posts 20 as well as the bottom face 21' of the cup formations 21, the use of which will be described later. These bottom support formations 21 extend along a bottom planar surface of the mat sections.

Top support formations are constituted by the flat top wall 20" of the posts 20 and the flat top surfaces 15' of the bridge formations 15. As can be seen in FIGS. 3 to 5, the bridge formations are provided with a flanged flat bottom surface 19 which lie in the bottom planar surface and to provide additional support on a sub-flooring. The top support formations lie in a top planar surface of the mat section.

The vertical wire receiving slot 17 in the bridge formations 15 have an open top end 22 to receive the wires therein and have a depth sufficient to retain the heating wire spaced below the top surface 15', herein intermediate the top and bottom planar surfaces, herein the top surface 15' of the bridge formations, and the bottom surface 19 thereof. The wire receiving slot 17 is also dimensioned for frictional engagement with the electric heating wire positioned therein. The slot also has a concavely curved bottom edge 23 for smooth seating support of the heating wire. It also has substantially parallel side edges 24. Other mechanical wire retaining features such as undercuts, retaining slot with protrusions, etc., are envisaged for retaining the wire in the slot 17 and one of these is illustrated in FIG. 6.

It is pointed out that the mat sections 11, and consequently the entire support meshing 10, is constructed of a suitable plastic material. Preferably the mat sections are injection molded.

The bridge formations 15 are also provided with passage formations 25 formed in their bottom edge to provide for the passage of a cementitious slurry thereunder, as will be described later. The transversely extending bridge formations 15 which extend in parallel and transverse relationship form large openings 26 in which a cementitious slurry can set. These openings 26 can be of varying sizes but it has been found that one square inch openings are adequate for the effective use of this product as well as supporting people walking thereon. As previously described, the mat sections 11 can be of square or rectangular cross-sections and they form interconnectable sections of convenient size, such as 17 inches by 17 inches, for packaging and manipulation during installation. The wire receiving slots are also dimensioned to frictionally engage the electric heating wire 12 therein. An alternative securing method for the wire, instead of frictional retention by pressure, is to position the wire receiving slots 17 of the bridge formations in offset alignment, as illustrated by the axes 27 and 27' in FIG. 3. This offset between adjacent bridge formations 15 are approximately 1/16 of an inch to give the electric heating wire 12 a slight curvature to provide for this retention along aligned wire receiving slots 17, as shown in FIG. 5.

As shown in FIG. 3, some of the post junctions 16 are attachment posts for securing two or more mat sections 11 together, as illustrated in FIGS. 1 and 2 to form the floor support meshing 10 or 10'. The mat section 11' as shown in FIG. 1, has four parallel side edges, herein identified by reference numerals 30, 31, 32 and 33. The attachment posts along side edge 30 and side edge 33 are illustrated in FIG. 3 to show the different configurations of the attachment posts. It is pointed out that the attachment post junctions along two adjacent ones of the side edges of the mat section, namely side edge 30 and 31, have male connecting pin formations 36 extending in a lower section thereof. The post junctions along the other two adjacent ones of the side edges, namely side edges 32 and 33, have cup formations 37. The cup formations 37 have an open top end or hole 38 configured to receive the pin formation 36 of another mat section in retention fit therein. Accordingly, the mat sections are interconnected together by these attachment posts and cups. It is further pointed out that the support meshing 10, as shown in FIG. 1, can be constructed on a sub-floor surface by first interconnecting a plurality of mat sections 11 together and cutting these mat sections to the contour shape of the sub-floor area to be covered. However, because of the flexibility of the material, an entire support meshing 10 can be installed in a factory with the heating wire 12 assembled therein and retained by glue inserted in the vertical wire receiving slots 17, or at least some of them. Some of the attachment posts may also be interconnected together by glue or by snap fit retention whereby an entire assembled support meshing 10 can be assembled and cut to a desired length or contour of a surface to be covered and then rolled to form a bundle for transportation.

FIG. 6 illustrates a modification of the wire receiving slot 17 including a mechanical wire retention feature in the form of a protrusion 50 formed in each of the side edges 24 of the slot. The protrusions 50 are disposed in facial alignment to define therebetween a restricted throat opening 51 to retain the wire 12 captive thereunder on the curved bottom edges 23' of the wall side wall formation 52 which results due to the use of mold inserts (not shown) used to mold the protrusions 50. The restricted throat opening 51 is only slightly smaller than the diameter of the heating wire 12, i.e. a few millimeters, whereby not to damage the wire, but sufficient to maintain the wire captive thereunder. It is also pointed out that a single protrusion 50 may also be formed in only one of the side walls 52 and dimensioned to form an undercut thereunder to retain the wire. The restricted throat would then be formed between the single protrusion 50 and the opposed side wall 52.

Having thus described the heating wire support meshing 10 and mat sections 11, the method of constructing a heated surface having one or more heating wires therein will now be described with reference to FIGS. 1 and 6. As shown in FIG. 1, a support meshing 10 is disposed on a sub-floor 43, as shown in FIG. 6, which sub-floor 43 could be for example a single plywood sheet, a concrete floor or an acoustical mat with the heating wire 12 disposed into the support meshing 10 as shown in FIG. 1. As previously described, because the heating wire 12 is retained below the top planar surface of the support meshing 10 and because of the close spacing of the transversely spaced parallel rows of wire support bridge formations, a person can walk on the support meshing disposed on a sub-floor. After the meshing is installed on the sub-flooring, and it can also be retained thereon by glue at spaced apart contact locations, a cementitious slurry 40 is applied over the support mat, usually starting at a corner of the floor area being covered. The slurry has a liquidity sufficient to flow into all of the passages and areas between the transverse bridge formations to seal the support meshing and the heating wire into the slurry. The top surface of the cementitious slurry is applied pressure and leveled by the use of a cement spreading tool, such as a straight edge toothed trowel 42, which is displaced over the cementitious slurry, as shown by arrow 44, while being guidingly supported at the bottom edge 45 thereof, over the top surfaces of the bridge formations 15 and posts 20 lying in the top planar surface of the support meshing to form a ribbed cementitious surface 40' extending above the top surface 15' of the meshing.

Depending on the material to be applied over the surface, the cementitious surface can be spread flat and let to dry if, for example a carpet is to be installed onto the heated floor. On the other hand, and as is most frequent, ceramic tiles, such as the tile 41, can be immediately positioned over the wet ribbed cement surface 41' and will adhere thereto as the slurry sets. Accordingly, a tradesperson can, in one working session, construct the entire radiant floor. Because the tiles 41 are supported above the top support formations of the support meshing and the heating wire(s) is below the top surface, there is no fear of disturbing the electric heating wire(s). However, it is preferable not to walk on the freshly laid tiles 41 to let the tiles set as these tiles are usually spaced apart to form joints to receive a grout therein after the cement has set.

While the floor is being assembled the end connector or connectors 13 of the heating wire circuit or circuits are connected to the cold lead or leads of the thermostat and embedded in the cement.

It is within the ambit of the present invention to cover any obvious modifications of the preferred embodiments described herein, provided such modifications fall within the scope of the appended claims.

We claim:

1. A heating wire support meshing comprising transversely spaced parallel rows of wire support bridge formations formed by vertical flat walls of flexible plastic material interconnected together at their crossings and extending in parallel and transverse relationship to form a mesh with through openings therebetween in which cementitious slurry is adapted to set on a sub-floor by passing through the heating wire support meshing, the through openings extend vertically through the heating wire support meshing for the cementitious slurry to reach the sub-floor through the through openings, said wire support bridge formations having vertical wire receiving slots having an open top end for receiving and guiding an electric heating wire along one or more desired paths between a bottom planar surface and a top planar surface of said wire support bridge formations with said wire extending across said through openings to be embedded in said cementitious slurry, said wire receiving slots each having a protrusion in one or both side walls thereof to define a restricted throat opening in a top end portion of said slot whereby to maintain said electric heating wire captive thereunder, said vertical flat walls being interconnected together at their said crossings by a post junction, and passages formed in said vertical flat walls for communication with adjacent ones of said openings for the passage of said cementitious slurry, and wherein some of said post junctions are attachment posts for securing two or more of said heating wire support meshing together in side-by-side relationship.

2. The heating wire support meshing as claimed in claim 1, wherein at least some of said wire receiving slots of adjacent parallel wire support bridge formations are aligned in alternating offset relationship for frictional retention of a heating wire disposed therethrough.

3. The heating wire support meshing as claimed in claim 1, wherein said wire receiving slot has a concavely curved bottom edge and substantially parallel side edges.

4. The heating wire support meshing as claimed in claim 1, wherein said bottom planar surface is constituted by at least a flat wall portion of said vertical wall.

5. The heating wire support meshing as claimed in claim 4, wherein said post junction defines a support post having a flat bottom and top surface lying respectively in said bottom and top planar surfaces, said bottom surface also constituting said surface engaging formations.

6. The heating wire support meshing as claimed in claim 4, wherein said top support formations is constituted by flat top surface sections of said wire support bridge formations and a flat top surface of said post junction.

7. The heating wire support meshing as claimed in claim 1, wherein said heating wire support meshing has parallel side edges, said attachment posts are defined by said post junctions along two adjacent ones of said parallel side edges, said attachment posts along one of said parallel side edges having male connecting pin formation in a lower section thereof and said post junctions along the other one of said two adjacent parallel side edges having cup formations having an open top end and configured to receive said pin formations of another heating wire support meshing for retention therein.

8. The heating wire support meshing as claimed in claim 1, wherein said heating wire support meshing constitutes a reinforced sheeting for a sub-floor on which said heating wire support meshing is secured.

9. The heating wire support meshing as claimed in claim 1, wherein the electric heating wire is retained by glue in said vertical wire receiving slots, said heating wire support meshing flexible mesh being a roll of flexible mesh.

10. The heating wire support meshing as claimed in claim 1, wherein said wire receiving slots of said wire support bridge formations between two adjacent parallel rows are axially aligned with one another to retain a heating wire along a substantially straight parallel run, said wire being disposed in a serpentine path in said heating wire support meshing and defined by parallel runs spaced a predetermined distance apart as defined by selected ones of said parallel rows, said spaced apart runs of said heating wire being interconnected by an intermediate end portion of said heating wire between said spaced apart runs.

\* \* \* \* \*